United States Patent
Lee et al.

(10) Patent No.: US 11,962,436 B2
(45) Date of Patent: Apr. 16, 2024

(54) USER DETECTION TECHNIQUE, AND METHOD AND APPARATUS FOR CHANNEL ESTIMATION IN WIRELESS COMMUNICATION SYSTEM SUPPORTING MASSIVE MULTIPLE-INPUT MULTIPLE-OUTPUT

(71) Applicants: Samsung Electronics Co., Ltd., Suwon-si (KR); POSTECH RESEARCH AND BUSINESS DEVELOPMENT FOUNDATION, Pohang-si (KR)

(72) Inventors: Namyoon Lee, Pohang-si (KR); Hyowon Lee, Pohang-si (KR)

(73) Assignees: Samsung Electronics Co., Ltd., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 17/925,183

(22) PCT Filed: May 14, 2021

(86) PCT No.: PCT/KR2021/006078
§ 371 (c)(1),
(2) Date: Nov. 14, 2022

(87) PCT Pub. No.: WO2021/230709
PCT Pub. Date: Nov. 18, 2021

(65) Prior Publication Data
US 2023/0164002 A1 May 25, 2023

(30) Foreign Application Priority Data
May 15, 2020 (KR) .................. 10-2020-0058400

(51) Int. Cl.
*H04L 25/02* (2006.01)

(52) U.S. Cl.
CPC ........ *H04L 25/021* (2013.01); *H04L 25/0204* (2013.01)

(58) Field of Classification Search
CPC .................. H04L 25/021; H04L 25/0204
See application file for complete search history.

(56) References Cited

U.S. PATENT DOCUMENTS 8,649,472 B1 * 2/2014 Nabar ................ H04L 25/0256
375/350
9,509,443 B1 * 11/2016 Tarokh ................ H04J 11/0046
(Continued)

FOREIGN PATENT DOCUMENTS

KR    10-2008-0009332 A    1/2008
KR    10-2009-0003185 A    1/2009
(Continued)

OTHER PUBLICATIONS

Namyoon Lee, Massive MIMO is Very Useful for Pilot-Free Uplink Communications, 2020 Information Theory and Applications Workshop (ITA 2020), Feb. 2-7, 2020, San Diego, California, USA.
(Continued)

*Primary Examiner* — Jaison Joseph
(74) *Attorney, Agent, or Firm* — Jefferson IP Law, LLP

(57) ABSTRACT

Disclosed are a user detection technique, and a method and apparatus for channel estimation in a wireless communication system supporting massive multiple-input multiple-output. The method comprises the steps of: receiving a superimposed signal including a transmission signal of at least one user equipment (UE) from among a plurality of user equipments, wherein each transmission signal includes a pilot signal of a corresponding user equipment; calculating a sample covariance matrix from the received superimposed
(Continued)

signal by using the number of antennas of a base station and a pilot signal matrix of the at least one user equipment; calculating a likelihood function indicating the likelihood probability of the received superimposed signal, on the basis of the number of antennas of the base station and the received superimposed signal; detecting a user index set indicating whether or not the plurality of user equipments have transmitted signals, by using the calculated likelihood function and sample covariance matrix; and performing channel estimation of the at least one user equipment that is transmitting the signal, on the basis of the detected user index set.

15 Claims, 6 Drawing Sheets

(56) References Cited

U.S. PATENT DOCUMENTS

| | | |
|---|---|---|
| 2006/0268676 A1 | 11/2006 | Gore et al. |
| 2007/0189404 A1 | 8/2007 | Baum et al. |
| 2016/0219627 A1 | 7/2016 | Au et al. |
| 2017/0352608 A1 | 12/2017 | Sueyoshi et al. |
| 2018/0123765 A1 | 5/2018 | Cao et al. |
| 2018/0124598 A1 | 5/2018 | Zeng |
| 2018/0199359 A1 | 7/2018 | Cao et al. |
| 2018/0351708 A1* | 12/2018 | Wang .............. H04L 25/021 |
| 2018/0375555 A1 | 12/2018 | Noh et al. |
| 2019/0068335 A1 | 2/2019 | Li et al. |
| 2019/0150191 A1 | 5/2019 | Lee et al. |
| 2019/0349146 A1 | 11/2019 | Wu et al. |
| 2023/0164002 A1* | 5/2023 | Lee .............. H04L 25/0242 375/262 |
| 2023/0198810 A1* | 6/2023 | Choi .............. H04B 7/0413 375/262 |

FOREIGN PATENT DOCUMENTS

| | | |
|---|---|---|
| KR | 10-2014-0104903 A | 8/2014 |
| KR | 10-1606159 B1 | 3/2016 |
| KR | 10-2018-0019692 A | 2/2018 |
| KR | 10-2019-0103359 A | 9/2019 |
| WO | 2016/110914 A1 | 7/2016 |
| WO | 2017/086753 A1 | 5/2017 |
| WO | 2018/031620 A1 | 2/2018 |

OTHER PUBLICATIONS

Korean Office Action dated Jan. 2, 2024, issued in Korean Application No. 10-2020-0058400.

* cited by examiner

USER DETECTION TECHNIQUE, AND METHOD AND APPARATUS FOR CHANNEL ESTIMATION IN WIRELESS COMMUNICATION SYSTEM SUPPORTING MASSIVE MULTIPLE-INPUT MULTIPLE-OUTPUT

CROSS-REFERENCE TO RELATED APPLICATION(S)

This application is a U.S. National Stage application under 35 U.S.C. § 371 of an International application number PCT/KR2021/006078, filed on May 14, 2021, which is based on and claims priority of a Korean patent application number 10-2020-0058400, filed on May 15, 2020, in the Korean Intellectual Property Office, the disclosure of which is incorporated by reference herein in its entirety.

TECHNICAL FIELD

The disclosure relates to a method and device for performing user detection and channel estimation from superimposed signal received from a plurality of UEs by a base station supporting massive multiple-input multiple-output (MIMO).

BACKGROUND ART

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

There is considered massive connectivity to support Internet of things (IoT) and machine-type communication (MTC) as one of the goals of next-generation communication.

Multiple-input multiple-output (MIMO) technology spatially multiplexes and transmits information according to an instantaneous channel generated from a plurality of transmission/reception antennas. With the capability of spatially multiplexing and transmitting a plurality of data streams in one time and frequency resource, MIMO transmission may increase the data transmission rate several times more than conventional non-MIMO transmission. Further, as channel fading is suppressed in the base station and user equipment using multiple antenna technology, the channel capacity, network coverage, and spectrum use may be significantly increased.

In particular, the massive multiple antenna system (massive MIMO system or massive multi-input multi-output system) may install multiple antennas in the base station (BS) to thereby meet a high data rate required in the next-generation communication system even with a simple linear precoder. In theory, use of an infinite number of antennas may completely address various issues to limit system performance, such as inter-user interference (IUI), as well as fast fading.

In an environment in which communication technology becomes more complex, a base station needs to connect with numerous UEs or devices. However, since orthogonal multiple access (OMA) used in 4G communication uses orthogonality of resources, the number of users that it may serve within a limited frequency resource is limited. Therefore, a non-orthogonal multiple access (NOMA) technique is being considered for massive access in next-generation communication.

Each UE is assigned a pilot signal to identify the user, and the pilot signal may be a sequence previously agreed on with the base station. The base station may identify what UE approaches using the pilot sequence included in the signals received from UEs. Methods for user scheduling and channel estimation in the massive MIMO system largely include a grant-based method and a grant-free method. The conventional communication system performs user scheduling and channel estimation using the grant-based method that receives permission from the base station. However, in such a system where the number of UEs accessing the base station sharply increases, the grant-based method may have difficulty in supporting low latency. In contrast, the grant-free method, which sends signals while users compete with each other without permission from the base station, may more easily achieve low latency than the grant-based method but may be more complicated since the base station should perform user detection and channel estimation through the superimposed signal transmitted from the plurality of users. Accordingly, in next-generation communication requiring a low-latency condition, it is effective to use the grant-free method. There are ongoing research efforts to allow the base station to efficiently perform user detection and channel estimation from the overlapping reception signals.

If the plurality of UEs send signals to the base station for a predetermined channel coherence time according to the grant-free method, the base station receives the superimposed signal. The base station detects which UE has sent the signal using the received superimposed signal and estimates information about the channel of the detected user. In this system, the user detection and user's channel estimation problem may be considered as a sparse signal estimation problem and, to address the sparse signal estimation problem, a compressive sensing algorithm may be used. However, since the number of channels is a continuous number, it may deteriorate accuracy to simultaneously perform detection of the signal transmission user and channel estimation. To address such problem, a two-step conversion method has been considered that performs channel estimation after user detection, and could compensate for the accuracy deterioration problem. Therefore, if the transmission user is precisely detected first, channel estimation may be more efficiently performed.

Conventionally, as a method for detecting the user, the compressive sensing algorithm has been applied. However, vectorizing the system considering covariance of the reception signal corresponding to the pilot may change the features of the sensing matrix due to the Kronecker product operation and the performance of the compressive sensing algorithm. Therefore, although various estimation schemes have been researched in the compressive sensing algorithm, its substantial use may be difficult when the number of users capable of transmission increases, due to high computation complexity.

DETAILED DESCRIPTION OF THE INVENTION

Technical Problem

The disclosure proposes a method and device for a base station to receive the superimposed signal transmitted from a plurality of UEs in a massive MIMO system to efficiently detect the transmission user and estimate a channel.

The disclosure proposes a method and device for a base station to detect the transmission user and estimate a channel with low complexity through sample covariance computation from the superimposed signal transmitted from a plurality of UEs in a massive MIMO system.

The disclosure proposes a method and device for a base station to detect the transmission user and estimate a channel with low complexity using a likelihood function through probabilistic modeling on the overlapping reception signals in a massive MIMO system.

Technical Solution

According to an embodiment of the present invention, a method for receiving a signal by a base station in a massive multiple-input multiple-output system comprises receiving a superimposed signal including a transmission signal of at least one user equipment (UE) among a plurality of UEs, each transmission signal including a pilot signal of a corresponding UE, calculating a sample covariance matrix from the received superimposed signal using a pilot signal matrix of the at least one UE and the number of antennas of the base station, obtaining a likelihood function representing a likelihood probability of the received superimposed signal, based on the received superimposed signal and the number of antennas of the base station, detecting a user index set indicating whether the plurality of UEs transmit a signal using the obtained likelihood function and the sample covariance matrix, and performing channel estimation of at least one UE transmitting a signal, based on the detected user index set.

According to an embodiment of the present invention, a base station configured to receive a signal in a massive multiple-input multiple-output system comprises a transceiver configured to receive a superimposed signal including a transmission signal of at least one user equipment (UE) among a plurality of UEs, each transmission signal including a pilot signal of a corresponding UE and at least one processor configured to calculate a sample covariance matrix from the received superimposed signal using a pilot signal matrix of the at least one UE and the number of antennas of the base station, obtain a likelihood function representing a likelihood probability of the received superimposed signal, based on the received superimposed signal and the number of antennas of the base station, detect a user index set indicating whether the plurality of UEs transmit a signal using the obtained likelihood function and the sample covariance matrix, and perform channel estimation of at least one UE transmitting a signal, based on the detected user index set.

Other aspects, advantages, and core features of the present disclosure will be apparent to one of ordinary skill in the art from the following detailed description taken in conjunction with the accompanying drawings and disclosing preferred embodiments of the present disclosure.

Before getting into the detailed description of the present invention, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof.

The present invention describes an algorithm to estimate the transmission user with low complexity based on a likelihood function that calculates the signal received from the UE by the base station through probabilistic modeling.

Advantageous Effects

In the embodiments of the disclosure, a new algorithm having performance close to that of the full investigation method is proposed, thereby expecting detection of the transmitting user with lower computational complexity as compared to the full investigation method and with higher reliability than the conventional compressive sensing algorithm. It is expected to be able to estimate the transmission user with low complexity based on a likelihood function that calculates the signal received from the UE by the base station through probabilistic modeling. It may also be expected to obtain the optimal channel estimation performance using the index of the transmitting user.

MODE FOR CARRYING OUT THE INVENTION

Figure 1:
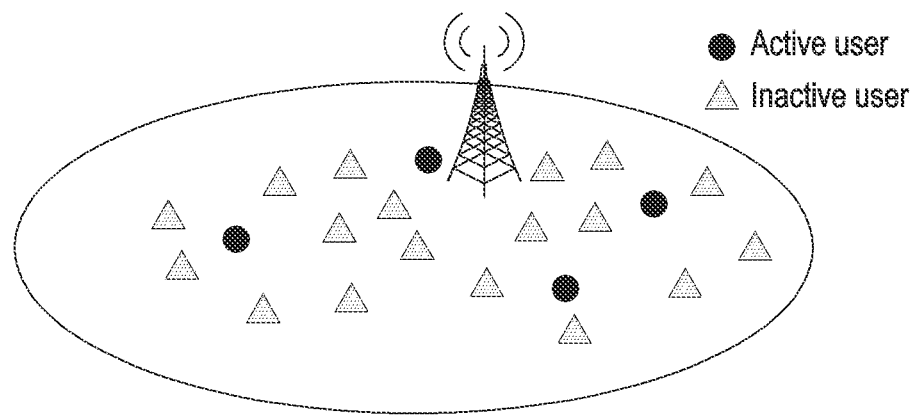
FIG. 1 illustrates a massive multiple-input multiple-output system structure according to an embodiment of the disclosure.

Embodiments of the disclosure are described in detail with reference to the accompanying drawings. It should be noted that the same element denotations are used to refer to the same elements throughout the specification. When determined to make the subject matter of the present invention unclear, the detailed description of the known art or functions may be skipped.

The terms described below are defined considering the functions in embodiments of the present disclosure and may be replaced with other terms according to the intention or practice of the user or operator. Therefore, the terms should be defined based on the overall disclosure.

Various changes may be made to the present invention, and the present invention may come with a diversity of embodiments. Some embodiments of the present invention are shown and described in connection with the drawings. However, it should be appreciated that the present invention is not limited to the embodiments, and all changes and/or equivalents or replacements thereto also belong to the scope of the present invention.

As used herein, the singular forms "a," "an," and "the" are intended to include the plural forms as well, unless the context clearly indicates otherwise. Accordingly, as an example, a "component" includes one or more component representations.

The terms coming with ordinal numbers such as 'first' and 'second' may be used to denote various components, but the components are not limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Various embodiments as set forth herein may be implemented as software (e.g., a program) including one or more instructions that are stored in a storage medium (e.g., internal memory or external memory) that is readable by the electronic device. For example, a processor of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the electronic device may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM) or digital versatile disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a block or a program) of the disclosure may include a single entity or multiple entities. According to various embodiments, one or more of the above-described components may be omitted, or one or more other components may be added. Alternatively or additionally, a plurality of components (e.g., blocks or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, according to an embodiment of the disclosure, an electronic device may provide a channel for wireless communication with the UE. The electronic device may mean a base station, an access network (AN), a radio access network (RAN), an eNB, an eNodeB, a 5G node, a transmission/reception point (TRP), or a 5th generation NodeB (5gNB). In the embodiments described below, a base station is used as an example of the electronic device for convenience purposes. The terminal may mean, e.g., a user equipment (UE), a mobile station, a subscriber station, a remote terminal, a wireless terminal, or a user device which communicates with the base station through a wireless channel. Further, according to an embodiment of the disclosure, the MIMO system may be implemented in various wireless communication systems supporting MIMO, which is multi-antenna technology, such as long-term evolution (LTE) systems, long-term evolution-advanced (LTE-A) systems, LTE-A pro systems, or the above-described 5G systems, as proposed in the 3rd generation partnership project (3GPP).

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

However, the present invention is not limited to the embodiments disclosed herein, and various changes may be made thereto. The embodiments disclosed herein are provided only to inform one of ordinary skilled in the art of the category of the present disclosure. The present invention is defined only by the appended claims.

In uplink grant-free NOMA communication, the base station receives signals of overlapping users. If the base station accurately finds the transmission user, the conventional minimum mean square error channel estimation method may be used, so that it is critical to determine whether the user performs transmission. To that end, in an embodiment of the disclosure, it may be considered as the compressive sensing problem that finds the sparse transmission user with a sample covariance according to the number of antennas of the base station using the time-frequency pilot transmitted from the uplink user. In another embodiment, as a method to find the sparse transmission user in the covariance matrix, the transmission user may be found using a conventional algorithm by vectorizing the covariance matrix. Meanwhile, the base station may estimate the sparse transmission user by the maximum likelihood estimation method with probabilistic modeling of the reception signal, but the complexity may exponentially increase depending on the total number of users and the number of transmitting users. Accordingly, the present invention describes a transmission user estimation method with low complexity using a likelihood function through probabilistic modeling on the reception signal from the base station. A method for selecting and allocating a pilot sequence suitable for the actual environment is also included.

FIG. 1 illustrates a massive multiple-input multiple-output system structure according to an embodiment of the disclosure.

FIG. 1 illustrates a single cell system in which a base station with M antennas services N users. Among the N users, K users may transmit signals during one time unit (time interval) using a grant-free scheme. Accordingly, the base station receives the superimposed signal as transmitted from the K users. The uplink channel vector between the antennas of the base station and the nth user may be represented as $h_n \in C^{M \times 1}$. The channel considers an independent block-fading model that experiences flat fading during a coherence time. The channel vector of user n may have the distribution $h_n \sim CN(0, \sigma_h^2 I)$ assuming the Rayleigh fading model, and the effect of large scale fading and shadow fading of the channel is reflected to $\sigma_h^2$.

Figure 2:
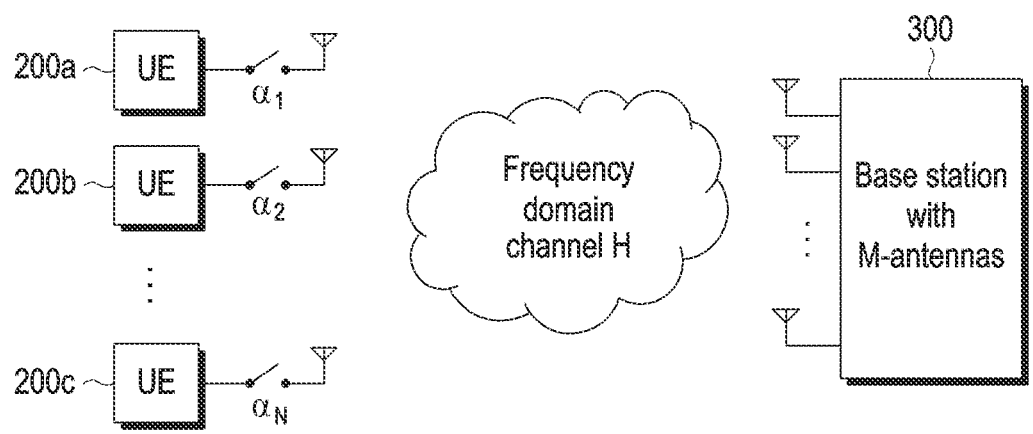
FIG. 2 illustrates a communication structure of a UE and a base station according to an embodiment of the disclosure, which represents communication according to whether a UE performs transmission.

FIG. 2 illustrates communication according to whether a UE performs transmission in a communication structure of a UE and a base station according to an embodiment of the disclosure. Referring to FIG. 2, for uplink channel estimation, each user $200a$, $200b$, and $200c$ may have a different pilot signal $s_n \in C^{L \times 1}$ including a sequence with a length of L (L<T), and each sequence may be previously shared with the base station. It is assumed that among the N users $200a$, $200b$, and $200c$, K users simultaneously transmit signals during the coherence time. In this case, the signal received by the base station and the transpose matrix of the reception signal may be represented as in Equation 1.

$$Y^T = HAS^T + V$$

$$Y = SAH^T + V^T \qquad \text{Equation 1}$$

In Equation 1, H is the channel matrix indicating the channel between the users and the base station, A is the diagonal matrix indicating whether users transmit or not and has binary elements of {0,1}, S indicates the pilot signal matrix including the pilot sequences of the users, and V indicates the noise matrix following the Gaussian distribution $CN(0, \sigma_v^2 I)$.

Figure 3:
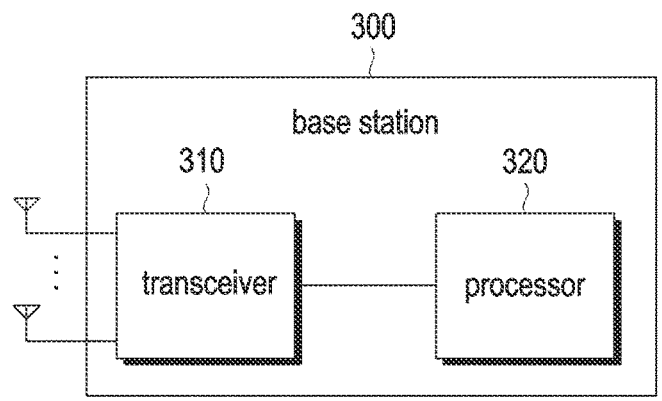
FIG. 3 illustrates a structure of a base station according to an embodiment of the disclosure.

FIG. 3 illustrates a structure of a base station according to an embodiment of the disclosure. In embodiments of the disclosure, the operations of performing signal reception and user detection and channel estimation may be performed by the base station. Referring to FIG. 3, a base station 300 may include a transceiver 310 and at least one processor 320. The at least one processor 320 may transmit and receive wireless signals through the transceiver 310. The at least one processor 320 may control the overall device to allow the base station to perform signal reception, user detection, and channel estimation according to the method described in the embodiments of the disclosure.

Figure 4:
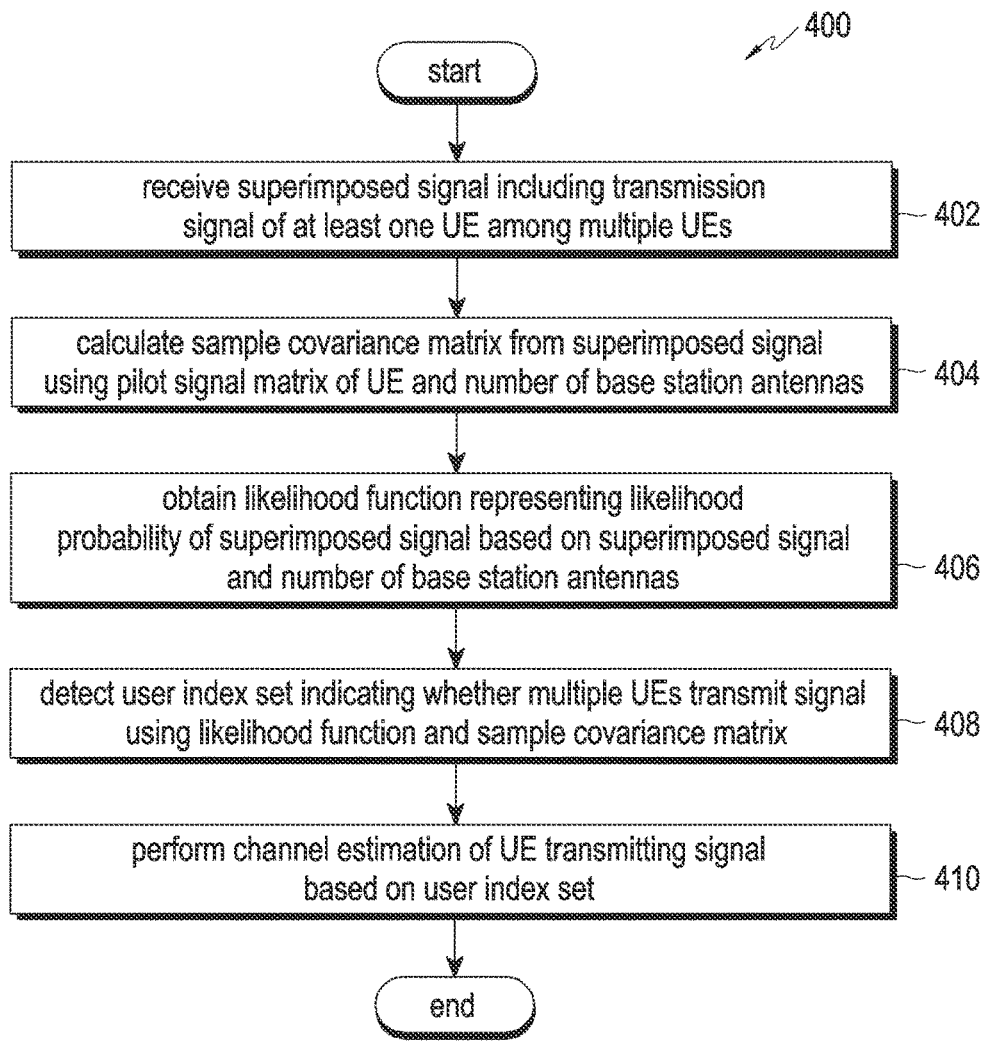
FIG. 4 is a flowchart illustrating a method for detecting a user based on transmission signals of UEs and predicting a channel as proposed in the disclosure.

FIG. 4 is a flowchart 400 illustrating a method for detecting a user based on transmission signals of UEs and predicting a channel as proposed in the disclosure.

Referring to FIG. 4, in step 402, the base station may receive superimposed signal including the transmission signal of at least one UE among a plurality of UEs. Each transmission signal may include the pilot signal of the corresponding UE. The pilot signal of each UE may include a sequence previously known to the base station. In step 404, the base station may calculate the sample covariance matrix from the superimposed signal using the pilot signal matrix including the pilot sequences of the UEs and the number of base station antennas. In step 406, the base station may obtain a likelihood function that represents the likelihood probability of the received superimposed signal based on the received superimposed signal and the number of base station antennas. In step 408, the base station may detect a user index set indicating whether the plurality of UEs transmit signals by using the likelihood function and the sample covariance matrix.

In an embodiment, upon detecting the user index set, a first user index set indicating whether the UE transmits a signal to allow the likelihood function to have the maximum value may be determined, and a second user index set indicating whether first and second UEs transmit may be detected using the first user index set and the obtained likelihood function. The user index set may be a second user index set finally obtained by repeating the step of detecting the second user index set, predetermined K times.

In another embodiment, upon detecting the user index set, conditional covariance matrixes for identifying whether the plurality of UEs transmit signals may be calculated using the pilot signal matrixes of the plurality of UEs, and a log-likelihood ratio may be detected using the conditional covariance matrixes, the likelihood function, and the sample covariance matrix. A user index set including the user indexes of the plurality of UEs, including the at least one UE to allow the detected log-likelihood ratio to have the maximum value, may be detected. The user index of each of the plurality of UEs in the user index set may have a binary vector value of 0 or 1 depending on whether signal transmission is performed. In step 410, the base station may detect the transmitting UE based on the user index set and perform channel estimation on the detected UE.

Specifically, the sample covariance matrix of the reception signal including the pilot signal of the UE is calculated according to the number of base station antennas using the signal matrix Y representing the received signal, and the sample covariance matrix is defined as in Equation 2.

$$\hat{Y} = \frac{1}{M}YY^H = \frac{1}{M}SAH^T(H^T)^H AS^H + \frac{1}{M}VV^H \quad \text{Equation 2}$$

Here $\hat{Y}$ may be represented as the sample covariance matrix.

In Equation 2, when the number M of base station antennas is infinite, the channel and the matrix as to whether to transmit and its Hermitian product $$\frac{1}{M}AH^T(H^T)^H A$$

are diagonally matrixed and this value is defined as Φ. Here, A is the matrix indicating whether the user transmits or not, and is a real diagonal matrix with diagonal matrix elements of 0 or 1 and is $A=A^H$. V is the noise matrix following the Gaussian distribution $CN(0,\sigma_v^2 I)$.

$$\Phi_{n,n} = \begin{cases} \sigma_h^2, & A_{n,n} = 1 \\ 0, & A_{n,n} = 0 \end{cases} \quad \text{Equation 3}$$

Equation 3 is an equation related to Φ when M is infinite. Φ indicates the value that the component of the diagonal matrix has depending on whether transmission is performed and has the channel variance $\sigma_h^2$ or 0 depending on whether transmission is performed.

In contrast, when M is finite, the channel and the matrix as to whether to transmit and its Hermitian product $$\frac{1}{M}AH^T(H^T)^H A$$

may have non-zero values for the non-diagonal components, and the diagonal components have a difference in channel variance from when M is infinite. Therefore, the difference in channel variance between the non-zero non-diagonal component and the diagonal component may serve as noise, and the noise component is defined as $\Phi_e$, and the sample covariance equation is represented as Equation 4.

According to an embodiment, the sample covariance matrix of the disclosure may be calculated through $$\frac{1}{M}YY^H.$$

According to another embodiment, the sample covariance matrix of the disclosure may be calculated based on the number of base station antennas and the pilot signal matrix of the UE.

$$\frac{1}{M}YY^H = S\Phi S^H + S\Phi_e S^H + \frac{1}{M}VV^H \quad \text{Equation 4}$$
$$= S\Phi S^H + \overline{V}$$

Equation 4 may be vectorized to approach as the compressive sensing problem, which may be performed by at least one processor 320. Equation 4 is vectorized into Equation 5.

$$vec\left(\frac{1}{M}YY^H\right) = (S^T)^H \otimes S vec(\Phi) + vec(\overline{V}) \quad \text{Equation 5}$$

vec( ) used in Equation 5 is the mapping function that vectorizes the matrix, and the operation ⊗ denotes the Kronecker product. In this case, $(S^T)^H \otimes S$ may be regarded as a sensing matrix. As described above, Φ has a diagonal matrix, and the diagonal components each have a value of $\sigma_h^2$ or 0. When vectorizing the diagonal matrix in Equation 5, the positions of the diagonal component and non-diagonal component of vec(Φ) are determined according to the mapping method. Therefore, it is possible to significantly reduce the dimension of the system by removing the row vector of the sensing matrix considering only the diagonal components which have substantial information. Here, the sensing matrix with the row vector removed is denoted as $\bar{s}_c$.

Equation 6 below represents an example of matrix $\bar{s}_c$ obtained by removing the row vector of the sensing matrix constructed by the Kronecker product. $\bar{s}_c$ may have the positions of the rows varied depending on the mapping method of vec( ). Because conventional compressive sensing algorithms have been studied in the real number area, $\bar{s}_c$ may be realized into $\bar{s}$. The column $$\begin{bmatrix} -\text{Im}(\bar{s}_c) \\ \text{Re}(\bar{s}_c) \end{bmatrix}$$

not marked here is because the matrix Φ has real values. In the pilot assign step shown in FIG. 5, the base station may map the characteristics of the matrix to be suitable for the compressive sensing algorithm as shown in Equation 6.

$$\bar{S}_c = \begin{bmatrix} S_{1,1}^H S_1 & S_{2,1}^H S_2 & \cdots & S_{N,1}^H S_N \\ S_{1,2}^H S_1 & S_{2,2}^H S_2 & \cdots & S_{N,2}^H S_N \\ \vdots & \vdots & \ddots & \vdots \\ S_{1,N}^H S_1 & S_{2,N}^H S_2 & \cdots & S_{N,N}^H S_N \end{bmatrix} \quad \text{Equation 6}$$

$$\bar{S} = \begin{bmatrix} -\text{Im}(\bar{S}_c) \\ \text{Re}(\bar{S}_c) \end{bmatrix}$$

Sparse signals may be restored by the orthogonal matching pursuit (OMP) and approximate message passing (AMP) algorithms, which are among the compressive sensing algorithms, and the Bayesian approximate message transfer (BAMP) which is an AMP algorithm suitable for binary signals. In the compressive sensing algorithm, the sensing matrix is denoted as A, the sparse vector of size N to be found as x, the noise vector of the Gaussian distribution having the variance $\sigma_w^2$ as w, and the M observation vectors in which they are linearly combined, as y.

The MP algorithm is one of the sparse approximate algorithms, and is an algorithm that updates the residual by finding the best matching. Matching is to calculate the correlation between the residual and the sensing matrix and selects the row with the highest correlation. The operation of the OMP algorithm at every tth iteration is represented as Equation 7.

$$\lambda_t = \mathrm{argmax}_j |A_j^T r_t|$$

$$\Lambda_t = \Lambda_{t-1} \cup \{\lambda_t\}$$

$$\hat{x} = \mathrm{argmax}_x \|y - A_{|\Lambda_t} \hat{x}\|^2$$

$$r_t = y - A_{|\Lambda_t} \hat{x} \qquad \text{Equation 7}$$

Meanwhile, approximate message passing (AMP) may be viewed as a simplified message transfer method based on Gaussian loopy belief propagation. The AMP algorithm adopts a scheme that takes a series of assumptions and approximations for computational efficiency in the conventional message transfer and performs independent scalar minimum mean square error (MMSE) estimation on all variables x to be found. In this case, a rule to estimate x from one scalar observation $y_k$ is as shown in Equation 8.

$$\hat{x}_{MMSE}(y_k) = E[x|y = y_k] \qquad \text{Equation 8}$$

AMP may express the estimation problem with the observation y as an uncoupled scalar problem based on N asymptotic analysis, and is expressed as Equation 9.

$$u_1 = x_1 + \tilde{w}_1 \qquad \text{Equation 9}$$
$$\vdots$$
$$u_N = x_N + \tilde{w}_N$$

Asymptotically in Equation 9, $\tilde{w}_n \sim N(0, \beta)$, and $\beta > \sigma_w^2$. In this case, AMP uncouples the iterative algorithm at every tth iteration through $u_t = x_t + A^T r_t$ to express it as a scalar problem and approximates it to $$\beta = \frac{1}{M} \|r_t\|_2^2.$$

According to this principle, the tth iteration of the AMP algorithm is expressed as Equation 10.

$$r_t = y - A\hat{x}_t + b_t r_{t-1}$$

$$\hat{x}_{t+1} = \eta(\hat{x}_t + A^T r_t; \lambda_t) \qquad \text{Equation 10}$$

In Equation 10, $b_t$ rand $\lambda_t$, respectively, are defined as $$\frac{1}{M} \|\hat{x}_t\|_0 \text{ and}$$

$$\frac{\alpha}{\sqrt{M}} \|r_t\|_2,$$

and $\eta(x; \tau)$ is a soft thresholding function considering sparse vectors and is defined as $\max(\mathrm{sign}(x)(|x|-\tau), 0)$. The above-described AMP algorithm was derived assuming that the elements of the sparse vector x were generated according to the Laplacian distribution. Equation 11 represents the Laplacian distribution.

$$f(x; 0, \kappa) = \frac{1}{2\kappa} \exp\left(-\frac{1}{\kappa}|x|\right) \qquad \text{Equation 11}$$

Therefore, the AMP algorithm is a method for estimating the MMSE based on the distribution of sparse vectors that are prior information.

When the distribution of the sparse vectors, which are the prior information, is not the Laplacian distribution, the application of the AMP algorithm may be limited. To address this, the Bayesian approximate message passing (BAMP) algorithm was studied. The characteristics of the BAMP algorithm are that it has the principle of uncoupling like the AMP algorithm and additionally uses structured sparsity. In other words, the BAMP algorithm uses the functions shown in Equation 12 instead of the soft thresholding function considering sparse vectors in the AMP algorithm.

$$F(u_n; \beta) = E[x_n | u_n; \beta] \qquad \text{Equation 12}$$

$$G(u_n; \beta) = \mathrm{var}[x_n | u_n; \beta]$$

$$F'(u_n; \beta) = \frac{d}{du_n} F(u_n; \beta)$$

The conditional expectation value, the first expression of Equation 12, denotes the scalar MMSE estimation when the measurement $u_n$ is given, and if prior information about the sparse vector x is given, the value $F(u_n; \beta)$, $G(u_n; \beta)$ may be expressed as an expression of closed form. In particular, when the transmission signal is a binary signal, the distribution of the prior sparse vectors may be expressed as Equation 13.

$$f(x_n) = \alpha_n \delta(x_n) + (1 - \alpha_n) \delta(x_n - 1) \qquad \text{Equation 13}$$

In Equation 13, $a_n$ means the probability that $x_n$ is 0. For all n's, when the sparsity level of the vector, K, is known definitively, $$a_n \text{ is } 1 - \frac{K}{N}.$$

In the binary signal, the values of Equation 12 are expressed as an equation in the closed form as in Equation 14.

$$F(u_n; \alpha_n, \beta) = \frac{1}{1 + \exp\left(\frac{1 - 2u_n}{2\beta} + \log \frac{\alpha_n}{1 - \alpha_n}\right)} \qquad \text{Equation 14}$$

$$G(u_n; \alpha_n, \beta) = F(u_n; a_n, \beta) - F(u_n; \alpha_n, \beta)^2$$

$$F'(u_n; \alpha_n, \beta) = \frac{1}{\beta} G(u_n; \alpha_n, \beta)$$

Therefore, the equation for the tth iteration of the BAMP algorithm is as in Equation 15.

$$u_t = \hat{x}_t + A^\top r_t \qquad \text{Equation 15}$$

$$\hat{x}_{t+1} = F(u_t; \beta_t)$$

$$r_{t+1} = y - A\hat{x}_t + r_t \frac{1}{M}\sum_{n=1}^{N} F'(u_t; \beta_t)$$

At every iteration, $\beta_t$ is defined as $$\frac{1}{M}\|r_t\|_2^2.$$

As initial values in AMP algorithm and BAMP algorithm, $\hat{x}_0$ is the 0 vector, and the initial value of $r_o$ may be set as the observation y.

Since the objective function of the compressive sensing algorithm is an algorithm to reduce the mean square error between the estimated vector and the actual vector, there may be relatively poor performance as compared to the maximum likelihood (ML) method based on mathematical modeling.

Therefore, the disclosure may use the covariance matching pursuit (CMP) algorithm, which is an algorithm that may estimate the transmission user with low complexity based on the likelihood function through probabilistic modeling on the reception signal of the base station. Since the reception signal is column-wise independent under the above-described channel environment assumption, the likelihood function is expressed as in Equation 16.

$$f_{ML}(a) = -\frac{1}{M}\log p(Y|a) \quad \text{Equation 16}$$

$$= -\frac{1}{M}\log \prod_m p(y_m|a)$$

$$= \log|\Sigma_Y| + tr(\Sigma_Y^{-1}\hat{Y}) + C$$

In Equation 16, the mth column $y_m$ of the reception signal has the distribution $CN(0,\Sigma_Y)$ and is represented as $\Sigma_Y = SAS^H + \sigma^2 I$. Further, in Equation 16, $f_{ML}(a)$ may be expressed as the likelihood function, and $p(Y|a)$ may be represented as the likelihood of the received superimposed signal. $\Sigma Y$ may be expressed as a covariance matrix of the reception signal. The likelihood function may be organized to represent the covariance matrix using log and $$-\frac{1}{M}.$$

Here, M denotes the number of base station antennas. Therefore, the maximum likelihood value may be obtained from the organized likelihood function. Obtaining the maximum likelihood value is the same as finding a with the lowest value of the likelihood function which is $f_{ML}(a)$ as in Equation 17.

According to an embodiment, the likelihood function of step 406 of FIG. 4 may be obtained using $$-\frac{1}{M}\log p(Y|a).$$

According to another embodiment, the likelihood function of step 406 of FIG. 4 may be obtained using $\log|\Sigma_Y| + tr(\Sigma_Y^{-1}Y) + c$.

$$\text{argmin}_{a \in \{0,1\}^N, \|a\|_0 = K} f_{ML}(a) \quad \text{Equation 17}$$

To find the optimal a, full investigation which considers all cases meeting the condition should be done, but it may be limited to apply to the system in which many users try to access one base station due to the exponentially increasing, high calculation complexity of $$O\left(\left(\frac{N}{K}\right)^K\right).$$

Therefore, as an approach to address this problem, a CMP algorithm may be used to have lower computation complexity than the high computation complexity of the full investigation.

The basic idea of the CMP algorithm is to obtain the sample covariance of the reception signal, find each transmission user most suitable for the sample covariance, and perform iterative computation until K most suitable transmission users are detected.

Equation 1 representing the transpose matrix of the reception signal is organized like Equation 18 according to the CMP algorithm.

$$y_m = SA(h^\top)_m = \quad \text{Equation 18}$$

$$s_n a_n (h^\top)_m + \sum_{i \in A^{k-1}} s_i a_i (h^\top)_m + \sum_{j \notin \{A^{k-1} \cup \{n\}\}} s_j a_j (h^\top)_m + v_m =$$

$$s_n a_n (h^\top)_m + \overline{s}^{k-1}(h^\top)_m + \overline{s}_{n^c}^{k-1}(h^\top)_m + v_m$$

Equation 18 represents an equation for one column m of the reception signal matrix, and may be described as the corresponding equation depending on whether the user transmits or not. Equation 18 above is an equation expressed with the last line of Equation 18 according to the number k of iterations, $a_n$ indicates whether the nth user transmits and has a binary value of 0 or 1, and $A^{k-1}$ is the index set of the transmission users detected up to the K−1th iteration. $\overline{s}^{k-1}$ denotes the pilot matrix of the transmission users detected up to the K−1th iteration, and denotes the pilot matrix of users who do not transmit until the K−1th iteration, including the nth user.

Initialization: $a = 0$, for $k = 0$ to $K$     Equation 19

$a_n = 1_{\{j \in A^{k-s} \cup \{n\}\}} (1 \le n \le N)$ $A^k = \{A^{k-1} \cup \text{argmin}_n(f_{ML}(a_n))\}$ Output: estimated index set $A^k$ Stop condition: Return $A^{K-1}$, $$\text{if } -\frac{1}{M}\log p(Y|a_{A^{k-t}}) < -\frac{1}{M}\log p(Y|A_{A^k})$$

Output: estimated index set $A^{k-1}$

Equation 19 is to detect a user index set through iterative calculation using the likelihood function. Here, I is the indicator function and may have a value of 1 for the element that meets the condition. The initial value according to the user number is 0, and the user index set $A^k$ may be obtained through K iterative calculations in total. The user index set may include the user indexes having a binary vector value of 0 or 1 depending on whether the UE transmits a signal.

According to an embodiment, in step 408 of FIG. 4 of the disclosure, the iteration equation of Equation 19 may be applied. The user index set A of Equation 18 may be the user index set including the user index of the optimal UE a of Equation 17 to have the maximum value of the likelihood function of Equation 16. Equation 19 may determine the first user index set $A^1$ that indicates whether the first UE transmits a signal to allow the likelihood function to have the maximum value. The second user index set indicating whether the first UE and the second UE transmit may be detected using the first user index set and the likelihood function. The Kth user index set which is finally obtained by repeating the detection operation k times may be detected. The kth iterative calculation may be performed which may be predetermined using the user index obtained by iterative calculation k−1 times, $A^{k-1}$, and the likelihood function of Equation 16, and the user index obtained thereby may be $A^k$.

In Equation 18, to calculate the likelihood from $y_m$, the precise distribution of $\bar{s}_{n^c}^{k-1}$ is needed. However, to figure out the distribution of $\bar{s}_{n^c}^{k-1}$, high calculation complexity of $$O\left(\left(\frac{N-k}{K-k}\right)^{K-k}\right)$$

is required. To address high complexity difficulties, $\bar{s}_{n^c}^{k-1}$ may be modeled as in Equation 20 using the conditional expected value.

$$\bar{s}_{n^c}^{k-1} = \sum_{j \notin \{A^{k-1} \cup \{n\}\}} s_j E[a_j = 1 | a_n] \quad \text{Equation 20}$$

As an example in Equation 20, when whether the user transmits or not has a uniform distribution which is $$p(a_n = 1) = \frac{K}{N} \text{ for all } n\text{'s},$$

$$E[a_j = 1 | a_n = 1] = \frac{K-k}{N-k} \text{ and } E[a_j = 1 | a_n = 0] = \frac{K-(k-1)}{N-k}.$$

Figure 5:
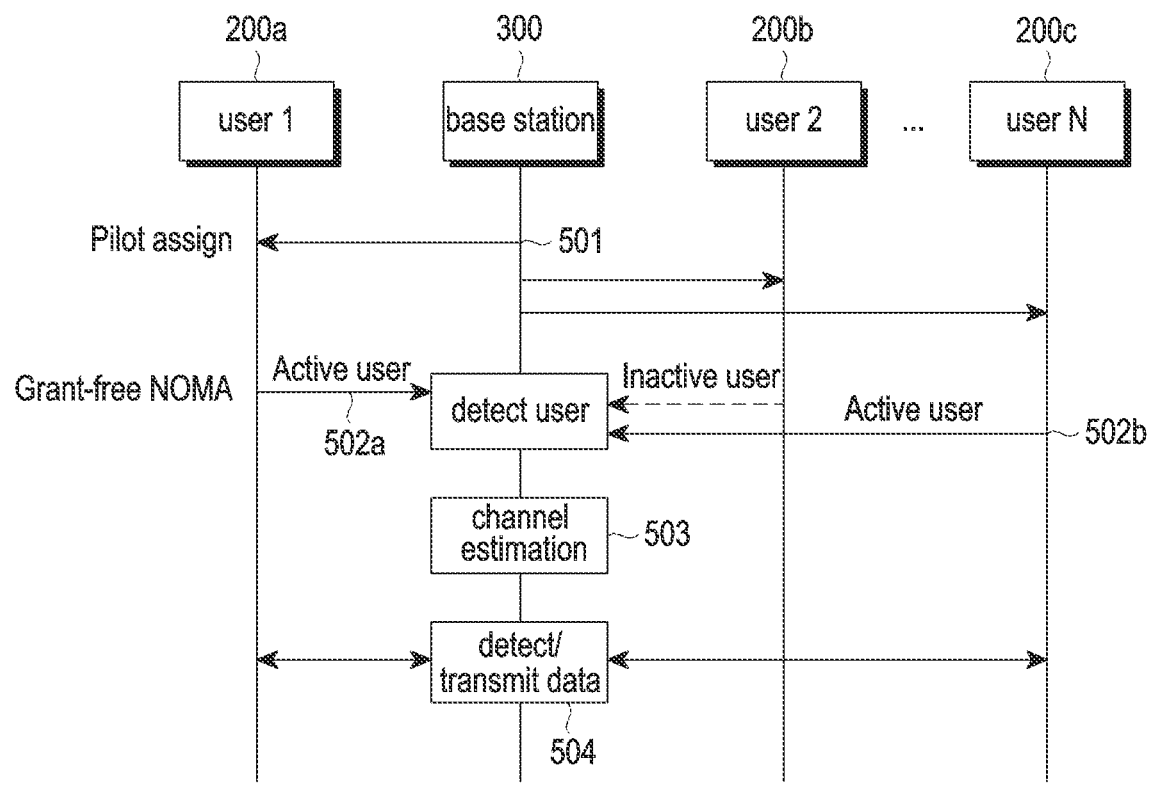
FIG. 5 illustrates operations of a base station and a plurality of UEs in a wireless communication system according to an embodiment of the disclosure.

On the other hand, in the case of a non-uniform distribution, performance enhancement may be expected when the base station allocates an appropriate pilot signal to the user according to the probability value of the user activity in the pilot assign step of FIG. 5.

In an embodiment of the disclosure, when the value of the actual vector is a binary vector having 0 or 1, a method for determining the conditional covariance value through a hypothesis test may be used. To that end, in Equation 18, if the conditional covariance is modeled according to $a_n$, Equation 21 results.

$$\Sigma_{n|0}^k = (\bar{s}^{k-1} + \bar{s}_{n^c}^{k-1})(\bar{s}^{k-1} + \bar{s}_{n^c}^{k-1})^H + \sigma^2 I$$

$$\Sigma_{n|1}^k = (s_n + \bar{s}^{k-1} + \bar{s}_{n^c}^{k-1})(s_n + \bar{s}^{k-1} + \bar{s}_{n^c}^{k-1})^H + \sigma^2 I \quad \text{Equation 21}$$

By Equation 21, conditional covariance matrices for identifying whether a plurality of UEs transmit signals may be calculated based on pilot signal matrices of the plurality of UEs. Further, $y_m$ has a complex Gaussian distribution with an expected value of 0 by assumption. Thus, at the kth iteration, the distribution $\mathcal{H}_{n|0}^k$ of hypotheses when $a_n = 0$, and the distribution $\mathcal{H}_{n|1}^k$ of hypotheses when $a_n = 1$ may be represented as Equation 22.

$$\mathcal{H}_{n|0}^k : CN(0, \Sigma_{n|0}^k)$$

$$\mathcal{H}_{n|1}^k : CN(0, \Sigma_{n|1}^k) \quad \text{Equation 22}$$

Based on the distribution of hypotheses, a hypothesis testing function representing the log-likelihood ratio may be obtained using the conditional covariance matrix, the likelihood function, and the sample covariance matrix.

$$\Lambda_n^k = \frac{1}{M} \log \frac{p(Y | a_n = 1, S, A^{k-1})}{p(Y | a_n = 0, S, A^{k-1})} = \quad \text{Equation 23}$$

$$\log \frac{|\sum_{n|0}^k|}{|\sum_{n|1}^k|} - tr\left((\sum_{n|1}^k)^{-1} \hat{Y}\right) + tr\left((\sum_{n|0}^k)^{-1} \hat{Y}\right)$$

Equation 23 corresponds to an example of a calculation formula in which hypothesis testing is applied to the CMP algorithm. According to an embodiment, Equation 23 may be applied as a method for detecting the user index set in step 408 of FIG. 4 of the disclosure. In the CMP algorithm to which hypothesis testing is applied, the optimal user having the largest scaled log-likelihood ratio, $\Lambda_n^k$ in the hypothesis testing function may be found with k iterative calculations. Here, the optimal user may be the user transmitting an uplink signal.

Initialization: $a = 0$, for $k = 0$ to $K$     Equation 24

$$a_n = 1_{\{j \in A^{k-s} \cup \{n\}\}} (1 \leq n \leq N)$$

$$A^k = \{A^{k-1} \cup \text{argmin}_n(f_{ML}(a_n))\}$$

Output: estimated index set $A^k$

Stop condition: Return $A^{K-1}$, $$\text{if } -\frac{1}{M} \log p(Y | a_{A^{k-1}}) < -\frac{1}{M} \log p(Y | A_{A^k})$$

Output: estimated index set $A^{k-1}$

Equation 24 represents a calculation formula for obtaining a user index set through iterative calculations using a hypothesis testing function. The basic principle is the same as in Equation 19, but the log-likelihood ratio is used by applying the hypothesis testing function to the likelihood function.

According to an embodiment, Equation 24 may be applied as a method for detecting the user index set in step 408 of FIG. 4 of the disclosure. The UE which allows the log-likelihood ratio indicated by the obtained hypothesis testing function to have the maximum value may be found, and the user index set including the user index of the UE may be detected. By repeatedly performing Equation 24 K times, it is possible to detect the user index set for all the transmission users. At least one processor 320 of FIG. 3 may estimate the channel of the user transmitting a signal by using the minimum mean square error estimation scheme as shown in Equation 24, by referring to the user index set, A, indicating the user indexes of the detected users.

$$(\tilde{H})^T_Y = \text{argmin}_{H_A^T} \|Y - S_A H_A^T\|^2 \quad \text{Equation 25}$$

The subscript Y in the matrix of Equation 25 means the sub-matrix having the corresponding index of the matrix. Accordingly, it is possible to obtain the transmission user index and the estimated value of the channel experienced by the transmission user through a series of processes.

The user detection error rates of the embodiments proposed in the disclosure and compressive sensing were experimentally compared and verified.

FIG. 5 illustrates operations of a base station and a plurality of UEs in a wireless communication system according to an embodiment of the disclosure. The base station 300 may assign pilot sequences to a plurality of UEs 200a, 200b, and 200c through the pilot assign step 501 and transmit them. Among the plurality of UEs, at least one UE 200a and 200c may transmit the pilot signal including the assigned pilot sequence when transmitting an uplink signal (502a and 502b). However, the non-transmitting UE 200b transmits no uplink signal so that the base station 300 does not detect other information related to user 2 200b. The base station 300 may receive superimposed signal including transmission signals including the pilot signals of the plurality of UEs 200a and 200b, detect a user index set by methods according to embodiments of the disclosure, and perform user detection through the user index set. It is possible to detect the UE transmitting a signal by performing user detection and to perform channel estimation on the UE (503). Here, channel estimation may be performed through the minimum mean square error channel estimation scheme. Through channel estimation, the base station 300 may detect or transmit data to the UEs 200a and 200b (5040.

Figure 6:
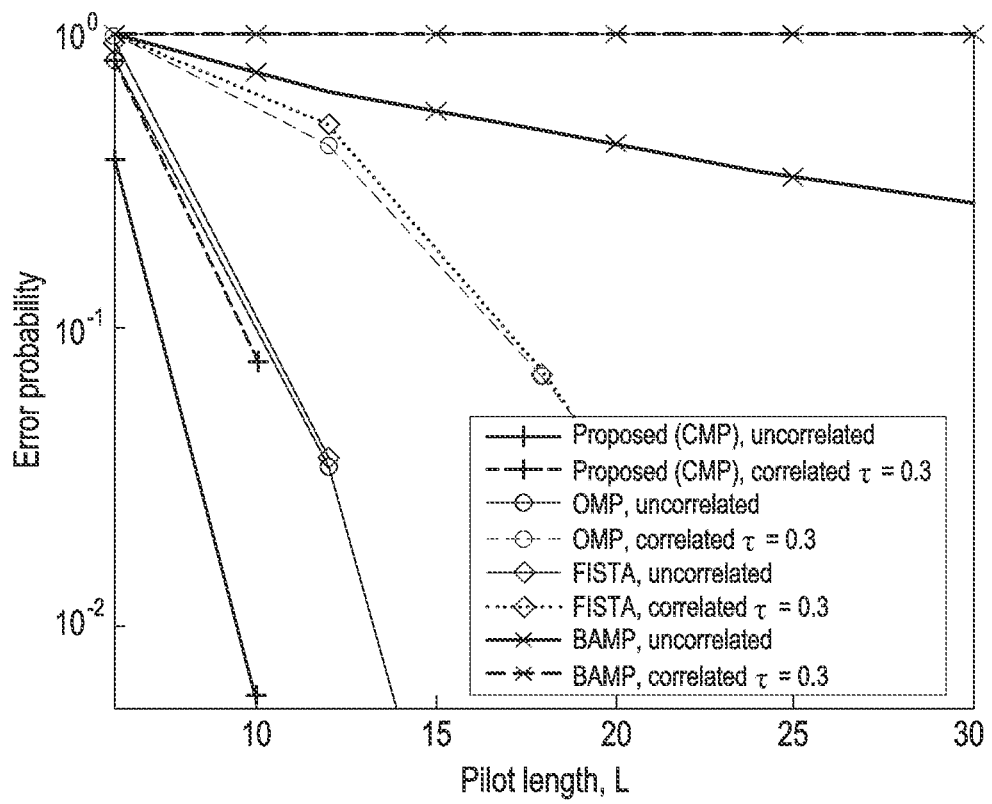
FIG. 6 illustrates a user detection error rate according to the pilot length of a plurality of algorithms using a sample covariance according to an embodiment of the disclosure.

FIG. 6 illustrates a user detection error rate according to the pilot length of a plurality of algorithms using a sample covariance according to an embodiment of the disclosure.

In the environment used in FIG. 6, the number M of base station antennas was 32, M=32, the total number N of users accessing the base station was 100, N=100, the number K of users actually transmitting was 5, K=5, and the signal-to-noise ratio was set to 10 dB. FIG. 6 shows comparison in error rate for user detection when applying the CMP, OMP, FISTA, and BAMP algorithms according to the pilot length when M=32, N=100, and K=5 and changes in error rate when there is a base station antenna correlation τ. In this case, the antenna correlation matrix was assumed as in Equation 26.

Referring to FIG. 6, it may be identified that the error rate is decreased in the order of BAMP, FISTA, and OMP and that the error rate of the CMP algorithm according to embodiments of the disclosure is smaller than those of the other algorithms and thus has excellent effects. It may also be identified that when there is the base station antenna correlation (τ=0.3), all of the algorithms cause an increase in error rate and thus experiences performance deterioration.

$$R = \begin{pmatrix} 1 & \tau & \cdots & \tau \\ \tau & 1 & \tau & \tau \\ \vdots & \ddots & \ddots & \vdots \\ \tau & \tau & \cdots & 1 \end{pmatrix} \qquad \text{Equation 26}$$

Figure 7:
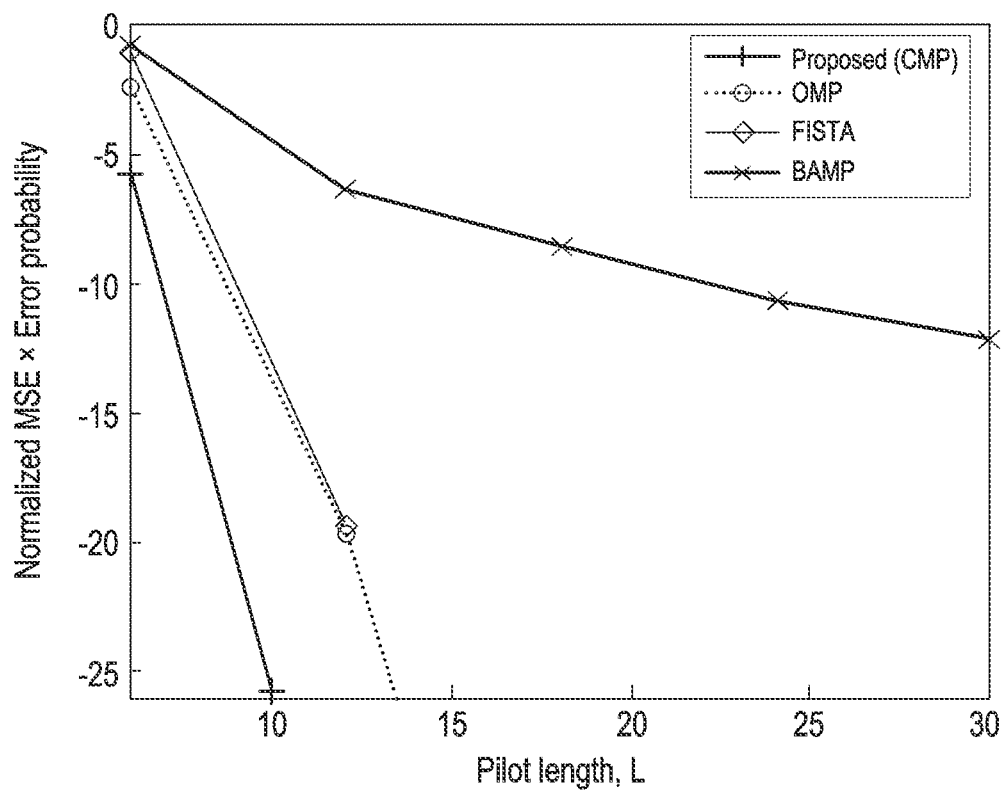
FIG. 7 illustrates a normalized mean square error value reflecting a user detection error rate according to the pilot length when a plurality of algorithms using a sample covariance have no antenna correlation according to an embodiment of the disclosure.

FIG. 7 illustrates a normalized mean square error value (NMSE) reflecting a user detection error rate according to the pilot length when a plurality of algorithms using a sample covariance have no antenna correlation according to an embodiment of the disclosure. To show the difference between the estimated channel and the actual channel when there is no antenna correlation, the normalized mean square error as shown in Equation 27 was considered. FIG. 7 reflects the error rate of FIG. 6. As identified from FIG. 7, it may be identified that the normalized mean square error value is decreased in the order of BAMP, FISTA, OMP, and CMP and that the error rate of the CMP algorithm according to embodiments of the disclosure is smaller than those of the other algorithms and thus has excellent effects.

$$E\left[\frac{\|\hat{H} - H\|_F^2}{\|H\|_F^2}\right] \qquad \text{Equation 27}$$

Figure 8:
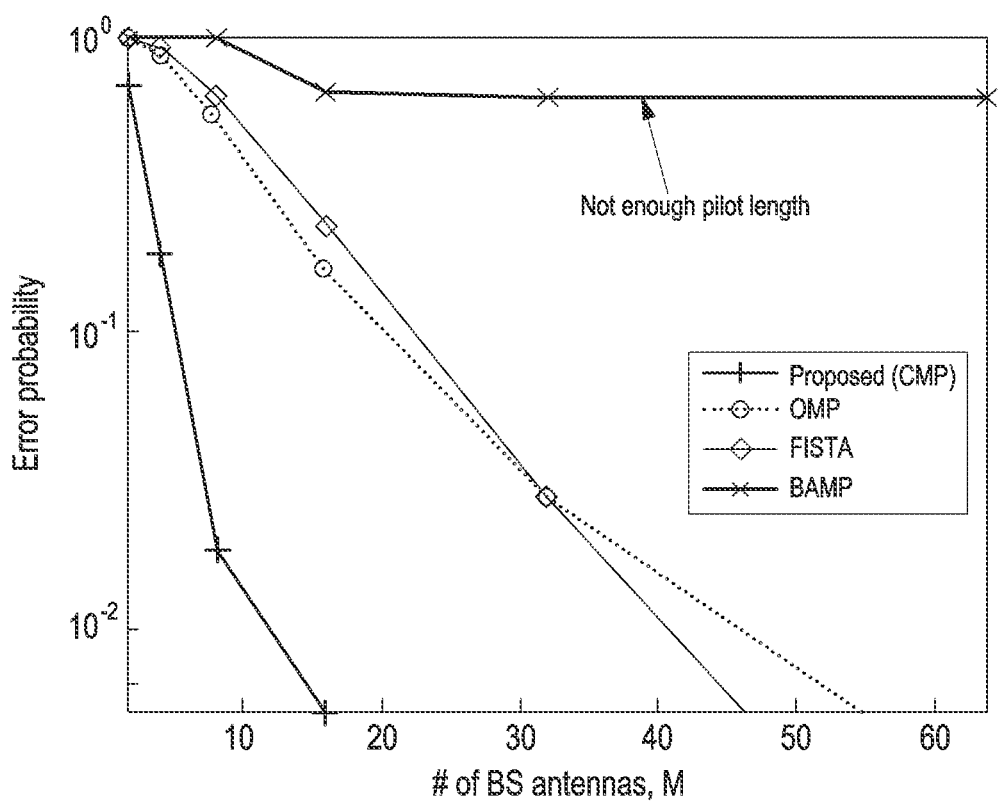
FIG. 8 illustrates a user detection error rate according to the number of base station antennas of a plurality of algorithms using a sample covariance according to an embodiment of the disclosure.

FIG. 8 illustrates a user detection error rate according to the number of base station antennas of a plurality of algorithms using a sample covariance according to an embodiment of the disclosure. FIG. 8 shows the user detection error rate according to the number of base station antennas when the pilot length L is constant as 12. It may be identified that the CMP algorithm according to embodiments of the disclosure reduces the user detection error rate and thus enhances performance as compared with other algorithms (BAMP, FISTA, and OMP) for compressive sensing and that it is possible to more efficiently reach the target error rate using a relatively short pilot length and relatively fewer antennas.

The embodiments herein are provided merely for better understanding of the present invention, and the present invention should not be limited thereto or thereby. In other words, it is apparent to one of ordinary skill in the art that various changes may be made thereto without departing from the scope of the present invention. Further, the embodiments may be practiced in combination. For example, the respective, at least portions, of the embodiments of the present invention may be combined and operated by the base station or the UE.

The embodiments herein are provided merely for better understanding of the present invention, and the present invention should not be limited thereto or thereby. The embodiments set forth herein are merely examples, and it will be apparent to one of ordinary skill in the art that various changes may be made thereto without departing from the scope of the present disclosure. The scope of the present disclosure should be defined by the following claims.

The invention claimed is:

1. A method for receiving a signal by a base station in a massive multiple-input multiple-output system, the method comprising:
receiving a superimposed signal including a transmission signal of at least one user equipment (UE) among a plurality of UEs, each transmission signal including a pilot signal of a corresponding UE;
calculating a sample covariance matrix from the received superimposed signal using a pilot signal matrix of the at least one UE and the number of antennas of the base station;
obtaining a likelihood function representing a likelihood probability of the received superimposed signal, based on the received superimposed signal and the number of antennas of the base station;
detecting a user index set indicating whether the plurality of UEs transmit a signal using the obtained likelihood function and the sample covariance matrix; and
performing channel estimation of at least one UE transmitting a signal, based on the detected user index set.

2. The method of claim 1, wherein detecting the user index set includes:
  determining a first user index set indicating whether a first UE transmits a signal to allow the obtained likelihood function to have a maximum value; and
  detecting a second user index set indicating whether the first UE and a second UE transmit signal, using the first user index set and the obtained likelihood function, and wherein the user index set is a Kth user index set finally obtained by repeating the detection predetermined K times.

3. The method of claim 1, wherein detecting the user index set includes:
  calculating conditional covariance matrixes to identify whether the plurality of UEs transmit a signal using pilot signal matrixes of the plurality of UEs;
  obtaining a hypothesis testing function representing a log-likelihood ratio using the conditional covariance matrixes, the likelihood function, and the sample covariance matrix; and
  detecting the user index set including user indexes of the plurality of UEs including the at least one UE to allow a log-likelihood ratio indicated by the obtained hypothesis testing function to have a maximum value, and wherein respective user indexes of the plurality of UEs have a binary vector value of 0 or 1 depending on whether to transmit a signal.

4. The method of claim 1, wherein the sample covariance matrix is calculated using $$\frac{1}{M} Y Y^H,$$

and wherein M indicates the number of antennas of the base station, and Y indicates a matrix of the received superimposed signal.

5. The method of claim 1, wherein the likelihood function is obtained using $$-\frac{1}{M} \log p(Y|a),$$

and wherein M indicates the number of antennas of the base station, and P(Y|a) indicates a likelihood of the received superimposed signal.

6. The method of claim 1, wherein the likelihood function is obtained using $\log|\Sigma_Y|+\text{tr}(\Sigma_Y^{-1}\hat{Y})+c$, and wherein in the equation, $\Sigma_Y$ indicates a covariance matrix of the received superimposed signal, and $\hat{Y}$ indicates the sample covariance matrix of the received superimposed signal.

7. The method of claim 1, wherein the channel estimation is performed through a minimum mean square error channel estimation scheme based on the received superimposed signal.

8. The method of claim 1, further comprising:
  allocating the pilot signals to the plurality of UEs, respectively; and
  transmitting the allocated pilot signals to the plurality of UEs.

9. A base station configured to receive a signal in a massive multiple-input multiple-output system, the base station comprising:
  a transceiver configured to receive a superimposed signal including a transmission signal of at least one user equipment (UE) among a plurality of UEs, each transmission signal including a pilot signal of a corresponding UE; and
  at least one processor configured to:
    calculate a sample covariance matrix from the received superimposed signal using a pilot signal matrix of the at least one UE and the number of antennas of the base station;
    obtain a likelihood function representing a likelihood probability of the received superimposed signal, based on the received superimposed signal and the number of antennas of the base station;
    detect a user index set indicating whether the plurality of UEs transmit a signal using the obtained likelihood function and the sample covariance matrix; and
    perform channel estimation of at least one UE transmitting a signal, based on the detected user index set.

10. The base station of claim 9, wherein the at least one processor is configured to:
  determine a first user index set indicating whether a first UE transmits a signal to allow the obtained likelihood function to have a maximum value; and
  detect a second user index set indicating whether the first UE and a second UE transmit signal, using the first user index set and the obtained likelihood function, and wherein the user index set is a Kth user index set finally obtained by repeating the detection predetermined K times.

11. The base station of claim 9, wherein the at least one processor is configured to:
  calculate conditional covariance matrixes to identify whether the plurality of UEs transmit a signal using pilot signal matrixes of the plurality of UEs;
  obtain a hypothesis testing function representing a log-likelihood ratio using the conditional covariance matrixes, the likelihood function, and the sample covariance matrix; and
  detect the user index set including user indexes of the plurality of UEs including the at least one UE to allow a log-likelihood ratio indicated by the obtained hypothesis testing function to have a maximum value, and wherein respective user indexes of the plurality of UEs have a binary vector value of 0 or 1 depending on whether to transmit a signal.

12. The base station of claim 9, wherein the sample covariance matrix is calculated using $$\frac{1}{M} Y Y^H,$$

wherein M indicates the number of antennas of the base station, and Y indicates a matrix of the received superimposed signal, wherein the likelihood function is obtained using $$-\frac{1}{M} \log p(Y|a),$$

and wherein M indicates the number of antennas of the base station, and p(Y|a) indicates a likelihood of the received superimposed signal.

13. The base station of claim 9, wherein the likelihood function is obtained using $\log|\Sigma_Y|+\text{tr}(\Sigma_Y^{-1}\hat{Y})+c$, and wherein in the equation, $\Sigma_Y$ indicates a covariance matrix of the received superimposed signal, and $\hat{Y}$ indicates the sample covariance matrix of the received superimposed signal.

14. The base station of claim 9, wherein the at least one processor is configured to perform the channel estimation through a minimum mean square error channel estimation scheme based on the received superimposed signal.

15. The base station of claim 9, wherein the at least one processor is further configured to:
  allocate the pilot signals to the plurality of UEs, respectively; and
  transmit the allocated pilot signals to the plurality of UEs through the transceiver.

* * * * *